(12) United States Patent
Kawano et al.

(10) Patent No.: US 8,752,901 B2
(45) Date of Patent: Jun. 17, 2014

(54) VEHICLE SEAT

(75) Inventors: Kenji Kawano, Owariasahi (JP);
Kousuke Sei, Toyota (JP); Takanori Kinoshita, Nagoya (JP)

(73) Assignee: Toyota Boshoku Kabushki Kaisha, Aichi-Ken (JP)

( * ) Notice: Subject to any disclaimer, the term of this patent is extended or adjusted under 35 U.S.C. 154(b) by 135 days.

(21) Appl. No.: 13/490,861

(22) Filed: Jun. 7, 2012

(65) Prior Publication Data
US 2012/0326484 A1    Dec. 27, 2012

(30) Foreign Application Priority Data

Jun. 21, 2011 (JP) ................................. 2011-137225

(51) Int. Cl.
*A47C 7/02* (2006.01)
(52) U.S. Cl.
USPC ................................ 297/452.55; 297/452.52
(58) Field of Classification Search
USPC ............. 297/452.55, 452.23, 452.21, 452.48, 297/452.52, 452.54, 452.53
See application file for complete search history.

(56) References Cited

U.S. PATENT DOCUMENTS

| | | | | |
|---|---|---|---|---|
| 4,643,480 A * | 2/1987 | Morita | ...................... | 297/452.38 |
| 5,016,941 A * | 5/1991 | Yokota | ...................... | 297/452.61 |
| 5,544,942 A * | 8/1996 | Vu Khac et al. | ......... | 297/452.37 |
| 5,927,817 A * | 7/1999 | Ekman et al. | ............. | 297/452.47 |
| 6,158,815 A * | 12/2000 | Sugie et al. | .............. | 297/452.61 |
| 6,286,903 B1 * | 9/2001 | Proux | ...................... | 297/452.26 |
| 6,634,718 B2 * | 10/2003 | Matsuo | ..................... | 297/452.18 |
| 6,648,419 B2 * | 11/2003 | Ratza et al. | .............. | 297/452.52 |
| 6,830,297 B2 * | 12/2004 | Gordon | .................... | 297/344.12 |
| 7,252,341 B2 * | 8/2007 | Kircher et al. | ........... | 297/452.55 |
| 8,136,884 B2 * | 3/2012 | Bullard et al. | ........... | 297/452.52 |
| 2012/0228918 A1 * | 9/2012 | Takahashi et al. | ....... | 297/452.55 |

FOREIGN PATENT DOCUMENTS

JP    2011-010748    1/2011

OTHER PUBLICATIONS

U.S. Appl. No. 13/557,589 to Kousuke Sei et al., which was filed on Jul. 25, 2012.

* cited by examiner

*Primary Examiner* — Jose V Chen
(74) *Attorney, Agent, or Firm* — Greenblum & Bernstein, P.L.C.

(57) ABSTRACT

In a vehicle seat, a back side, that is a side opposite a seating side, of a cushion is covered by a backing that has less expandability than the cushion. The back side of the cushion is divided by a pair of first supporting members into a center portion arranged between the pair of first supporting members and a pair of side portions arranged on both sides of the center portion. The center portion and the side portions each have a semi-cylindrical outer shape that protrudes out from the back side of the cushion. First arranging portions that are recessed toward the seating side are formed between the center portion and each of the side portions. The first supporting members are arranged sinking into the cushion at the first arranging portions.

2 Claims, 3 Drawing Sheets

VEHICLE SEAT

INCORPORATION BY REFERENCE

The disclosure of Japanese Patent Application No. 2011-137225 filed on Jun. 21, 2011 including the specification, drawings and abstract is incorporated herein by reference in its entirety.

BACKGROUND OF THE INVENTION

1. Field of the Invention

The invention relates to a vehicle seat provided with a cushion and linear supporting members that support the cushion.

2. Description of Related Art

Japanese Patent Application Publication No. 2011-10748 (JP 2011-10748 A), for example, describes one such known vehicle seat that includes a seat cushion and a seat back. The seat back is a member that is tiltably connected to the seat cushion, and includes a generally rectangular frame member that forms a seat frame, a cushion, and a pair of supporting members. The pair of supporting members are both linear members that extend in a longitudinal direction of the frame member, and curve in a seat width direction at a center portion in the longitudinal direction. In other words, the frame member is formed in the shape of a crank.

Also, the cushion is a member (made of polyurethane foam) that elastically supports an occupant, and includes a bulging portion and a backing. The bulging portion is a semi-cylindrical (e.g., arc-shaped or the like in a sectional view) convex portion that bulges out at the center of the underside of the cushion and extends in the longitudinal direction of the cushion. Also, the backing is a planar-shaped member (spun-bonded non-woven fabric) with less expandability than the cushion, and is arranged on the underside of the cushion.

In JP 2011-10748 A, the pair of supporting members are attached to the frame member and extend in the seat length direction. Also, when the cushion is arranged on the frame member, the cushion is supported by the pair of supporting members while the bulging portion is arranged between the pair of supporting members. With this kind of seat structure, for example, when the cushion is crushed by the load of an occupant, the seating comfort of the seat may decrease. Therefore, in JP 2011-10748 A, the pressing force received by the cushion is canceled out as much as possible by the repulsion force of the bulging portion, i.e., the contractile force of the hacking, such that the seating comfort of the seat is able to be well maintained.

However, in JP 2011-10748 A, the bulging portion is formed between the pair of supporting members. That is, the portion that the contractile force of the backing preferably acts on is formed on one portion of the cushion. Therefore, if the load of the occupant moves, as may occur when cornering, for example, the pressing force of the occupant is applied to another portion of the cushion (i.e., a location where the bulging portion is not formed), and as a result, the support performance of the cushion may be insufficient.

SUMMARY OF THE INVENTION

This invention thus provides a vehicle seat that further improves the support performance of a cushion.

One aspect of the invention relates to a vehicle seat that includes a seat structure member formed by a frame member and cushion, a linear pair of first supporting members that support the cushion, and a backing that covers a back, that is a side opposite a seating side, of the cushion and has less expandability than the cushion. The pair of first supporting members are attached to the frame member, and are arranged parallel to each other extending in the seat length direction. With this type of seat structure, it is desirable to be able to further improve the support performance of the cushion.

With the vehicle seat according to this aspect, a back side of the cushion is divided by the pair of first supporting members into a center portion arranged between the pair of first supporting members, and a pair of side portions arranged on both sides of the center portion. The center portion and the side portions each have a semi-cylindrical outer shape that bulges out from the back side of the cushion. First arranging portions that are recessed toward the seating side are formed between the center portion and each of the side portions. The first supporting members are arranged sinking into the cushion at the first arranging portions.

With this aspect, the plurality of bulging portions, i.e., the portions that the contractile force of the backing preferably acts on, are arranged around (i.e., in positions on the sides of) the occupant, thus enabling the seating comfort of the seat to be well maintained. Also, the positions of the plurality of bulging portions are able to be stably defined by the first supporting members that are arranged so as to sink in.

In the vehicle seat of the aspect described above, the seat structure member may have a second supporting member arranged crossing the pair of first supporting members. Also, the center portion may be divided by the second supporting member into a first portion and a second portion that is adjacent to the first portion. A second arranging portion that is recessed toward the seating side may be formed between the first portion and the second portion. The second supporting member may be arranged sinking into the cushion at the second arranging portion.

According to this structure, the plurality of bulging portions are arranged around the occupant (i.e., in front and rear positions or upper and lower positions with respect to the occupant), thereby enabling the seating comfort of the seat to be even better maintained.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 3:
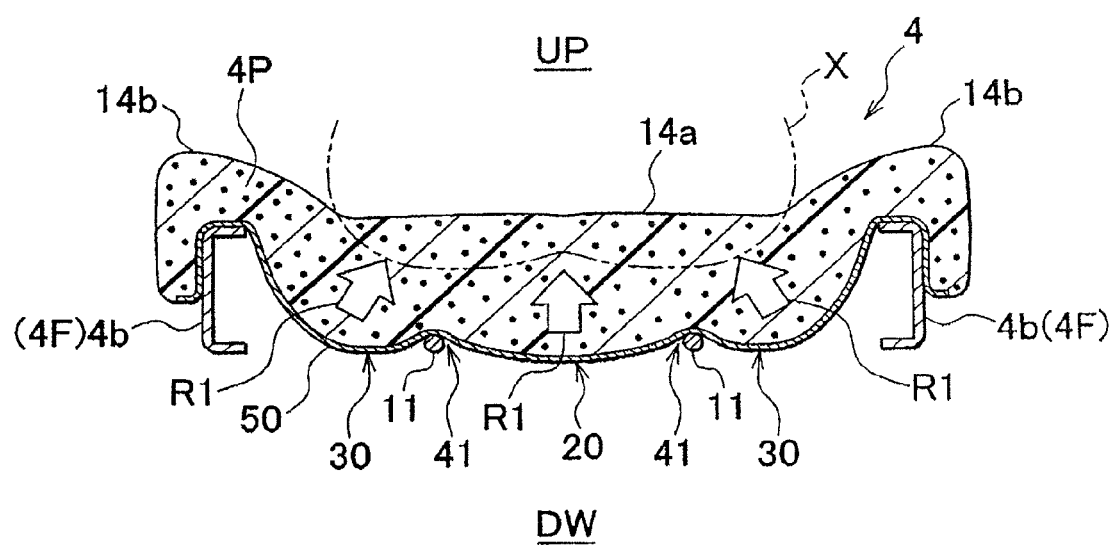
FIG. 3 is a sectional view taken along line III-III in FIG. 1.
Figure 4:
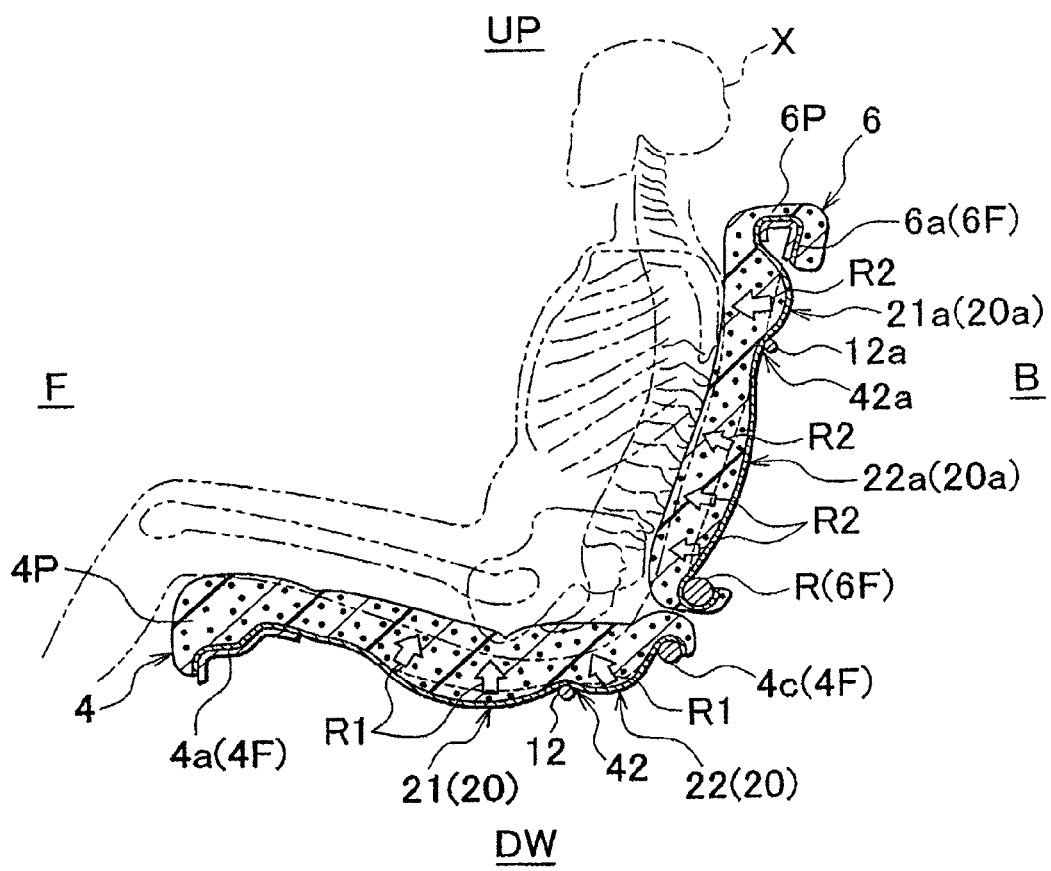
FIG. 4 is a sectional view of the vehicle seat.

Hereinafter, example embodiments of the invention will be described with reference to FIGS. 1 to 4. In the drawings, reference character F denotes a forward direction with respect to the vehicle seat, reference character B denotes a backward or rearward direction with respect to the vehicle seat, reference character UP denotes an upward direction with respect to the vehicle seat, and reference character DW denotes a downward direction with respect to the vehicle seat, as appropriate. FIGS. 3 and 4 show the vehicle seat without the cover for convenience. A vehicle seat 2 in FIG. 1 includes a seat cushion 4, a seat back 6, and a headrest 8. Each of these seat structure members includes a frame member (4F, 6F, 8F) that forms a seat frame, a cushion (4P, 6P, 8P) that forms the outer shape of the seat, and a cover (4S, 6S, 8S) that covers the cushion.

Figure 1:
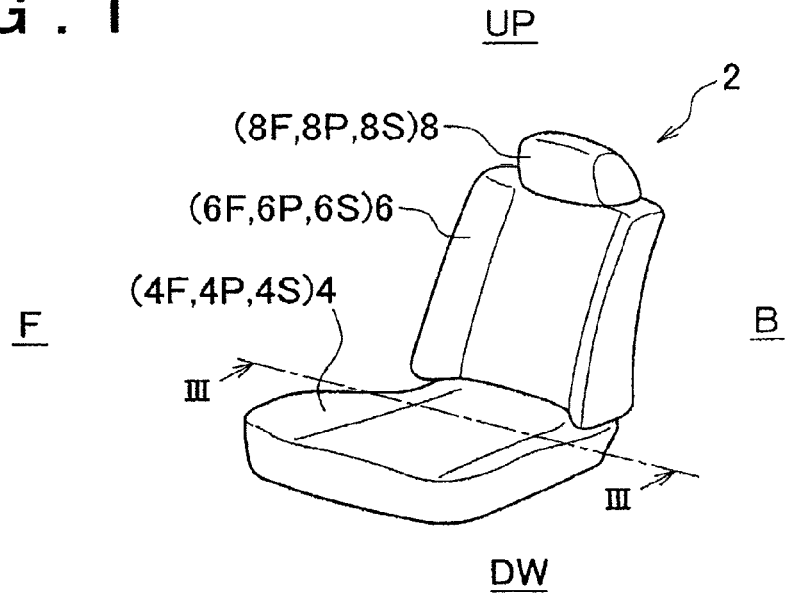
FIG. 1 is a perspective view of a vehicle seat according to an example embodiment of the invention.
Figure 2:
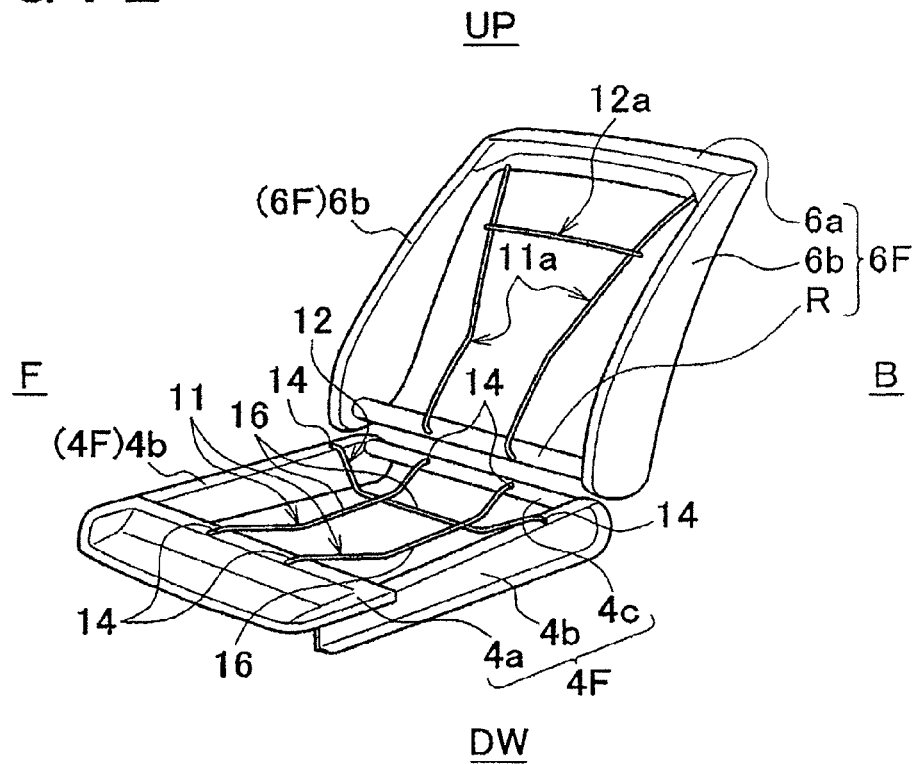
FIG. 2 is a perspective view of a frame member of the vehicle seat.

The seat cushion 4 includes the above structures (4F, 4P, 4S) and a plurality of supporting members 11 and 12 (see FIGS. 1 and 2). In a first example embodiment, the plurality of supporting members 11 and 12 are attached to the frame member 4F. Next, the surface of the cushion 4P is covered by the cover 4S while the cushion 4P is supported by the plurality of supporting members 11 and 12. An occupant is supported by the repulsion force of the cushion 4P (i.e., the contractile force of a backing 50 that will be described later), but with this kind of seat structure it is desirable to be able to further improve the support performance of the cushion 4P. Therefore, in this first example embodiment, the support performance of the cushion 4P is further improved with the structure described below.

The frame member 4F is generally rectangular when viewed from above, and includes a front frame 4a, a pair of side frames 4b, and a rear frame 4c (see FIG. 2). The front frame 4a is a flat plate member that forms a front portion of the seat cushion 4. Also, the pair of side frames 4b are flat plate members that form side portions of the seat cushion 4, and are arranged opposite each other on the sides of the seat. The rear frame 4c is a rod member that reinforces the rear portion of the frame member 4F, and may be arranged extending between the pair of side frames 4b.

A pair of first supporting members 11 and a second supporting member 12 that make up the plurality of supporting members are all linear members, each of which includes a retaining portion 14 and a supporting portion 16 (see FIG. 2). The material of the supporting members is not particularly limited as long as it is able to support an occupant X, but material (such as metal or resin or the like) that deforms under pressure (i.e., the load of the occupant X) applied to the seating surface is preferable. The retaining portion 14 is a straight portion at both ends of each supporting member, and is attached onto the frame member 4F. Also, the supporting portion 16 is a recessed portion provided midway in each supporting member, and protrudes out toward one side (i.e., the underside of the seat in this example embodiment) of each supporting member.

In this example embodiment, the pair of first supporting members 11 extend in the longitudinal (i.e., the length) direction of the seat cushion 4 (see FIGS. 2 to 4). At this time, the pair of first supporting members 11 are arranged bilaterally symmetrical (i.e., in the seat width direction), sandwiching a portion corresponding to the buttocks of a seated occupant. In other words, the pair of first supporting members 11 are arranged parallel along the legs of an occupant in a manner so as to be able to support the occupant X, presuming the occupant is seated. Also, the retaining portions 14 at both ends of each of the first supporting members 11 are fixed to the front frame 4a and the rear frame 4c while the supporting portions 16 that are in the center of the first supporting members 11 are protruding out on the underside of the seat.

Next, the second supporting member 12 is arranged crossing the pair of first supporting members 11 while extending in the width direction of the seat cushion 4. In this first example embodiment, the second supporting member 12 is arranged orthogonal to the first supporting members 11. At this time, the second supporting member 12 is preferably arranged to the rear of directly below the ischial tuberosity of the occupant X (i.e., to the rear of the portion where the load of the occupant is most applied) (see FIG. 4). Also, the retaining portions 14 on both ends of the second supporting member 12 are fixed to the side frames 4b, while the supporting portion 16 in the center of the second supporting member 12 protrudes out on the underside of the seat.

The cushion 4P is a generally rectangular-shaped member that forms the outer shape of the seat, and is able to elastically support the occupant X (see FIGS. 1 and 3). The material of the cushion 4P is not particularly limited, but a resin member of polyurethane foam or the like may be used, for example. The cushion 4P of the first example embodiment includes a sitting portion 14a, support portions 14b, a plurality of bulging portions (i.e., a center portion 20 and side portions 30), a plurality of arranging portions 41 and 42, and a backing 50. The sitting portion 14a is a flat portion in the center of the upper surface of the cushion 4P, and the support portions 14b are protruding portions on the sides of the sitting portion 14a. Also, the plurality of bulging portions (i.e., the center portion 20 and the side portions 30) are all portions that bulge out downward from the underside of the cushion 4P. The shape of the underside of the cushion (in a vertical section as seen from a front of the seat) is that of generally arc-shaped protrusions beneath the seat. Also the underside of the cushion 4P is divided into the plurality of bulging portions 20 and 30 by the pair of first supporting members 11.

The center portion 20 is arranged between the pair of first supporting members 11, i.e., in the center of the seat cushion 4, and has a first portion 21 and a second portion 22 (see FIGS. 3 and 4). In this example embodiment, the center portion 20 extends in the longitudinal direction of the seat (hereinafter simply referred to as the "longitudinal direction") between the pair of first supporting members 11, and is arranged directly below the buttocks (preferably the ischial tuberosity) of the occupant when the occupant is seated. Also, the center portion 20 is arranged in the center of the seat cushion 4 and receives the load of the occupant when driving normally. Also, the center portion 20 is divided into the first portion 21 and the second portion 22 by the second supporting member 12. The first portion 21 is a portion that forms a front portion of the center portion 20 and opposes the buttocks (preferably the ischial tuberosity) of the occupant. Also, the second portion 22 is a portion that is adjacent to the first portion 21 and forms a rear portion of the center portion 20.

The pair of side portions 30 are arranged on the sides of the center portion 20 (i.e., the sides of the seat), and each has a third portion and a fourth portion, not shown (see FIG. 3). The pair of side portions 30 extends in the longitudinal direction of the seat in positions adjacent to the center portion 20, and make up the sides of the seat cushion 4 when viewed in the seat width direction. Therefore, the side portions 30 are able to receive the load of the occupant when cornering, for example. Also, the side portions 30 are each divided into the third portion and the fourth portion, neither of which is shown, by the second supporting member 12, similar to the center portion 20 described above. The third portion is a portion that forms a front portion of each of the side portions 30 and is arranged adjacent to the first portion 21. Also, the fourth portion is a portion that forms a rear portion of each of the side portions 30 and is arranged adjacent to the second portion 22.

The center portion 20 and the side portions 30 all have generally semi-cylindrical outer shapes and bulge out downward from the underside of the cushion 4P (see FIGS. 3 and 4). Also, the outer shapes of the sectional shapes of the center portion 20 and the side portions 30 may be made up of arcs, parabolas, and catenaries. The outer shape of the center portion 20 is generally arc-shaped with the center of the cushion 4P as the apex, in a sectional view in the seat width direction.

Also, the center portion 20 is curved in a downward convex shape with the positions where the pair of first supporting members 11 (i.e., first arranging portions 41 that will be described later) are arranged as the base ends. Moreover, the first portion 21 is generally arc-shaped with substantially the center of the seat, i.e., a position opposite the buttocks of the occupant, as the apex, in a sectional view in the longitudinal direction of the seat, and has a downward convex shape. Also, the second portion 22 is generally arc-shaped with an intermediate position between the second supporting member 12 and the rear frame 4c as the apex, in a sectional view in the longitudinal direction of the seat. Further, the first portion 21 and the second portion 22 are both curved in downward convex shapes with the position where the second supporting member 12 is arranged (i.e., a second arranging portion 42 that will be described later) as the base portion.

Also, the outer shapes of the side portions 30 are generally arc-shaped with intermediate positions between the first supporting members 11 and the side frames 4b as the apexes, in a sectional view in the seat width direction. The side portions 30 are curved in downward convex shapes with the positions where the pair of first supporting members 11 and the side frames 4b are arranged (i.e., first arranging portions 41 that will be described later) as the base ends. Moreover, the third portion is generally arc-shaped with substantially the center of the seat side portion (i.e., a position to the side of the occupant X) as the apex, in a sectional view in the longitudinal direction of the seat, and has a downward convex shape. Also, the fourth portion is generally arc-shaped with an intermediate position between the second supporting member 12 and the rear frame 4c as the apex, in a sectional view in the longitudinal direction of the seat, and has a downward convex shape.

The first arranging portions 41 and the second arranging portion 42 are portions that are recessed toward the sitting side (i.e., the sitting portion 14a side) of the seat cushion 4, and are arranged such that the supporting members 11 and 12 sink into the seat cushion 4 (see FIGS. 3 and 4). The first arranging portions 41 are portions that place the first supporting members 11, and are formed between the center portion 20 and the side portions 30. Also, the second arranging portion 42 is a portion that places the second supporting member 12, and is formed crossing the center portion 20 and the side portions 30 in the seat width direction.

In this example embodiment, a pair of first arranging portions 41 are formed by the convex outline portion of the center portion 20 and the convex outline portions of the side portions 30. The first arranging portions 41 extend in the longitudinal direction of the seat and oppose the pair of first supporting members 11, between the center portion 20 and the side portions 30. The outline portion of the center portion 20 and the outline portions of the side portions 30 bulge out sandwiching the first arranging portions 41, so the first supporting members 11 are able to be arranged sinking into the seat cushion 4 at the first arranging portions 41. Also, the second arranging portion 42 of the center portion 20 is formed by the convex outline portion of the first portion 21 and the convex outline portion of the second portion 22. Moreover, the second arranging portion 42 of the side portions 30 is formed by the convex outline portion of the third portion and the convex outline portion of the fourth portion. The second arranging portion 42 extends in the seat width direction and is arranged opposite the second supporting member 12. Also, the outline portion of the third portion and the outline portion of the fourth portion bulge out sandwiching the second arranging portion 42, so the second supporting member 12 is able to be arranged sinking into the seat cushion 4 at the second arranging portion 42.

The backing 50 is a planar-shaped member having less expandability than (i.e., that does not expand as easily as) the cushion 4P (see FIGS. 3 and 4). Fabric (woven, knit, or non-woven), leather, or a resin layer are examples that may be used as the backing 50. Of these, spunbonded non-woven fabric (such as Tafnel (registered trade name) made by Mitsui Chemicals, Incorporated) is preferably used as the backing 50. In this example embodiment, the underside of the cushion 4P is covered by the backing 50. Also, as will be described later, when the cushion 4P deforms, the backing 50 contracts and then attempts to return to its original shape, thus giving the cushion 4P repulsion force (see arrows R1 in FIGS. 3 and 4).

Here, the method according to which the backing 50 is arranged is not particularly limited. The backing 50 may be attached to the underside of the cushion 4P after molding, or the backing 50 may be attached when the cushion 4P is molded. For example, the backing 50 may be arranged in a cavity of a die when the cushion 4P is molded. At this time, the backing 50 is preferably held taut following the underside shape (i.e., the bulging shape) of the cushion 4P. Then when the molding raw material (such as molten resin) is poured in, the backing 50 is attached while the cushion 4P is formed. At this time, the backing 50 is integrated with the underside of the cushion 4P by the molten resin penetrating and solidifying (i.e., being impregnated) between the fibers of the backing 50.

Referring to FIGS. 2 to 4, the cushion 4P is supported by the plurality of supporting members 11 and 12 while being arranged on the frame member 4F. In this example embodiment, the first supporting members 11 are arranged in the pair of first arranging portions 41, and the second supporting member 12 is arranged in the second arranging portion 42. Also, the center portion 20 is arranged between the pair of first supporting members 11, and the pair of side portions 30 are arranged on the outsides of the first supporting members 11 (i.e., on the sides of the seat). In this example embodiment, the plurality of supporting members 11 and 12 are arranged sinking into the cushion 4P, so the positions of the plurality of bulging portions (20 and 30 and the like) are able to be stably defined. The plurality of bulging portions (i.e., the second portion 22, the third portion, and the fourth portion) are arranged around the first portion 21, while the first portion 21 is arranged directly below the buttocks of the occupant.

With the seat structure described above, the cushion 4P (i.e., the center portion 20) may be crushed and deform under the pressing force of the occupant X during normal driving and the like (see FIGS. 3 and 4). In this example embodiment, when a pressing force (i.e., the load of an occupant) is applied to the cushion 4P, the backing 50 is expanded while the center portion 20 is crushed and deformed. At this time, the backing 50 contracts and then attempts to return to its original shape (i.e., contractile force of the backing 50 is generated) causing the center portion 20 to also attempt to return to its original shape, such that repulsion force (i.e., force in a direction that pushes the occupant X upward) is generated (see arrows R1 in FIGS. 3 and 4). Therefore, in this example embodiment, pressing force received by the cushion 4P during normal driving and the like is able to be canceled out as much as possible by the repulsion force of the center portion 20 (the first portion 21 in particular). Moreover, in this example embodiment, providing the plurality of bulging portions (i.e., the second portion 22 to the fourth portion) surrounding (i.e., wrapping around) the buttocks of the occupant X enables the occupant X to be stably supported.

Also, with the seat structure described above, when the load of the occupant moves during cornering, for example, pressing force may be applied to the side portions 30 of the cushion 4P. At this time, the pressing force applied to the side portions 30 of the cushion 4P causes the backing 50 to expand while the side portions 30 crush and deform. The contractile force of the backing 50 creates repulsion force in the side portions 30 (see arrows R1 in FIG. 3). Therefore, in this example embodiment, the pressing force received by the cushion 4P during corning is able to be canceled out as much as possible by the repulsion force of the side portions 30.

In the example embodiment described above, the plurality of bulging portions (20 and 30 and the like) are arranged directly below and around (i.e., in positions on the side and in positions in the front and rear of) the occupant X. The seating comfort of the seat is able to be well maintained by preventing or reducing crushing deformation of the cushion 4P, by the repulsion force of the plurality of bulging portions (20 and 30 and the like). Also in this example embodiment, the plurality of supporting members 11 and 12 are arranged sinking into the cushion 4P, so the positions of the plurality of the bulging portions (20 and 30 and the like) can be stably defined. Therefore, according to this example embodiment, the plurality of bulging portions (20 and 30 and the like) are able to further improve the support performance of the cushion 4P.

A seat back 6 according to a second example embodiment has substantially the same basic structure as the seat cushion 4 of the first example embodiment, so common structures will be denoted by corresponding reference characters, and detailed descriptions of those structures will be omitted. The seat back 6 includes the structures (6F, 6P, 6S) described above, a plurality of supporting members 11a and 12a, and a plurality of arranging portions (42 and the like) (see FIGS. 1, 2, and 4).

The frame member 6F (a frame body of a generally inverted U-shape) includes an upper frame 6a, a pair of side frames 6b, and a reclining shaft R (see FIG. 2). The upper frame 6a is a flat plate member that forms an upper portion of the seat, and the pair of side frames 6b are flat plate members that form side portions of the seat. Also, the reclining shaft R is a rod-shaped member that extends between the pair of side frames 6b at a lower portion of the seat, and is the center of a reclining and raising operation (i.e., a pivoting operation) of the seat back 6 with respect to the seat cushion 4.

A pair of first supporting members 11a and a second supporting member 12a that make up the plurality of supporting members are all linear members, with each having a retaining portion 14 (see FIG. 2). In this example embodiment, the pair of first supporting members 11a extends in the length direction of the seat back 6. At this time, the pair of first supporting members 11a are arranged bilaterally symmetrical (i.e., in the seat width direction) sandwiching a portion corresponding to the spine of a seated occupant. In other words, the pair of first supporting members 11a are arranged parallel to each other along the back of an occupant X such that the occupant X can be supported, presuming the occupant X is seated. Also, the retaining portions 14 at both ends of the first supporting members 11a are fixed to the upper frame 6a and the reclining shaft R. Next, the second supporting member 12a is fixed crossing the pair of first supporting members 11a while extending in the width direction of the seat back 6. In this second example embodiment, the second supporting member 12a is arranged orthogonal to the first supporting members 11a. At this time, the second supporting member 12a is preferably arranged above a position opposite the scapula of the occupant (i.e., in a position where the load of the occupant is most applied).

In the second example embodiment, the back of the cushion 6P is divided into a plurality of bulging portions (i.e., a center portion 20a and a pair of side portions and the like) by the first supporting members 11a and the second supporting member 12a (see FIG. 4). Also, the center portion 20a and the side portions, not shown, each have a semi-cylindrical outer shape and bulge out toward the rear from the back of the cushion 6P.

The center portion 20a of the second example embodiment is arranged between the pair of first supporting members 11a, and extends in the length direction of the seat in the center of the seat back 6. Also, the center portion 20a is arranged in the center of the seat back 6 (i.e., in a position opposite the back of the occupant) and thus is able to receive the load of the occupant during normal driving. Also, the center portion 20a is divided into a first portion 21a and a second portion 22a by the second supporting member 12a. The first portion 21a is a portion that forms an upper portion of the center portion 20a, and is opposite the scapula of the occupant when the occupant is seated. Also, the second portion 22a is a portion that forms a lower portion of the center portion 20a, and is arranged adjacent to the first portion 21a. Also, the pair of side portions, not shown, extend in the length direction of the seat on the sides of the seat back 6. Each side portion is arranged on a side of the seat back 6 (i.e., a side of the occupant) and thus is able to receive the load of the occupant when cornering, for example.

First arranging portions, not shown, and a second arranging portion 42a are portions that are recessed toward the seating side, and enable the supporting members to be arranged in a sunken in manner (see FIGS. 2 and 4). In the second example embodiment, the pair of first arranging portions, not shown, are formed by a convex outline portion of the center portion 20a, and convex outline portions of the pair of side portions. The first arranging portions are arranged opposite the first supporting members 11a and extend in the lengthen direction of the seat between the center portion 20a and the side portions. Also, the second arranging portion 42a is formed by a convex outline portion of the first portion 21a, and a convex outline portion of the second portion 22a. The second arranging portion 42a is arranged opposite the second supporting member 12a and extends in the seat width direction.

In the second example embodiment, pressing force received by the cushion 6P (i.e., the center portion 20a) during normal driving and the like is able to be canceled out as much as possible by the repulsion force of the center portion 20a (i.e., the contractile force of the backing 50) (see arrows R2 in FIG. 4). At this time, the occupant X is able to be stably supported by the first portion 21a and the second portion 22a provided around (i.e., wrapping around) the scapula of the occupant. Also, pressing force applied to the cushion 6P (i.e., the side portions) during cornering, for example, is able to be canceled out as much as possible by the repulsion force of the side portions. As described above, in the second example embodiment, the plurality of bulging portions (20a and the like) are arranged around the occupant (i.e., in side positions and upper and lower positions with respect to the occupant). The repulsion force of the plurality of bulging portions (20a and the like) prevents or reduces crushing deformation of the cushion 6P, so the seating comfort of the seat is able to be well maintained.

The vehicle seat 2 according to this example embodiment is not limited to the example embodiments described above. That is, various other example embodiments are also possible.

(1) In the example embodiments, the pair of first supporting members 11 (11a) are arranged in the vehicle seat 2, but three or more first supporting members may be arranged. In this case, the other first supporting member is preferably arranged next to the pair of first supporting members. Also, the plurality of protruding portions and the first arranging portions may be formed on the cushion according to the number of first supporting members that are arranged. Also, the first supporting members may be attached to the frame member in a non-detachable manner or in a detachable manner.

(2) Also, in the example embodiments, the singular second supporting member 12 (12*a*) is arranged in the vehicle seat 2, but a plurality of second supporting members may be arranged. For example, when there is a pair of second supporting members, one of the second supporting members is arranged at a rear portion (or lower portion) of the seat and the other second supporting member is arranged at a front portion (or upper portion) of the seat. Thus, the buttocks of the occupant (or the scapula of the occupant) is able to be surrounded from in front and behind (or above and below) the seat by this pair of second supporting members. Also, the center portion or the side portions may be divided into a plurality of portions (i.e., a plurality of second arranging portions may be formed) according to the number of second supporting members that are arranged. Also, the second supporting member may be attached to the side frame in a non-detachable manner or in a detachable manner. Further, similarly, the second supporting member may be attached to the first supporting members in a non-detachable manner or in a detachable manner.

(3) Also, in the example embodiments, the second supporting member 12 (12*a*) is arranged in the vehicle seat, but the second supporting member 12 (12*a*) may also be omitted.

What is claimed is:

1. A vehicle seat that includes a seat structure member formed by a frame member and cushion, comprising:
   a linear pair of first supporting members that support the cushion; and
   a backing that covers a back side of the cushion, the back side being a side opposite a seating side of the cushion and having less expandability than the cushion, wherein
   the pair of first supporting members are attached to the frame member, are parallel to each other and extend along a seat length direction,
   the back side of the cushion is divided by the pair of first supporting members into a center portion arranged between the pair of first supporting members, and a pair of side portions arranged on both sides of the center portion;
   the center portion and the side portions each have a semi-cylindrical outer shape that projects from the back side of the cushion away from the seating side of the cushion,
   first arranging portions are recessed portions of the back side of the cushion that are recessed toward the seating side of the cushion and are provided on the back side of the cushion between the center portion and each of the side portions, and
   the first supporting members are recessed into the back side of the cushion at the first arranging portions.

2. The vehicle seat according to claim 1, wherein
   the seat structure member has a second supporting member that crosses the pair of first supporting members in a seat width direction,
   the center portion is divided by the second supporting member into a first portion and a second portion that is adjacent to the first portion,
   a second arranging portion is a recessed portion of the back side of the cushion that is recessed toward the seating side of the cushion and is provided on the back side of the cushion between the first portion and the second portion, and
   the second supporting member is recessed into the back side of the cushion at the second arranging portion.

* * * * *